Dec. 30, 1941.　　　　D. C. RAINE　　　　2,268,167
VEHICLE CONSTRUCTION
Filed Sept. 5, 1940　　　3 Sheets-Sheet 2
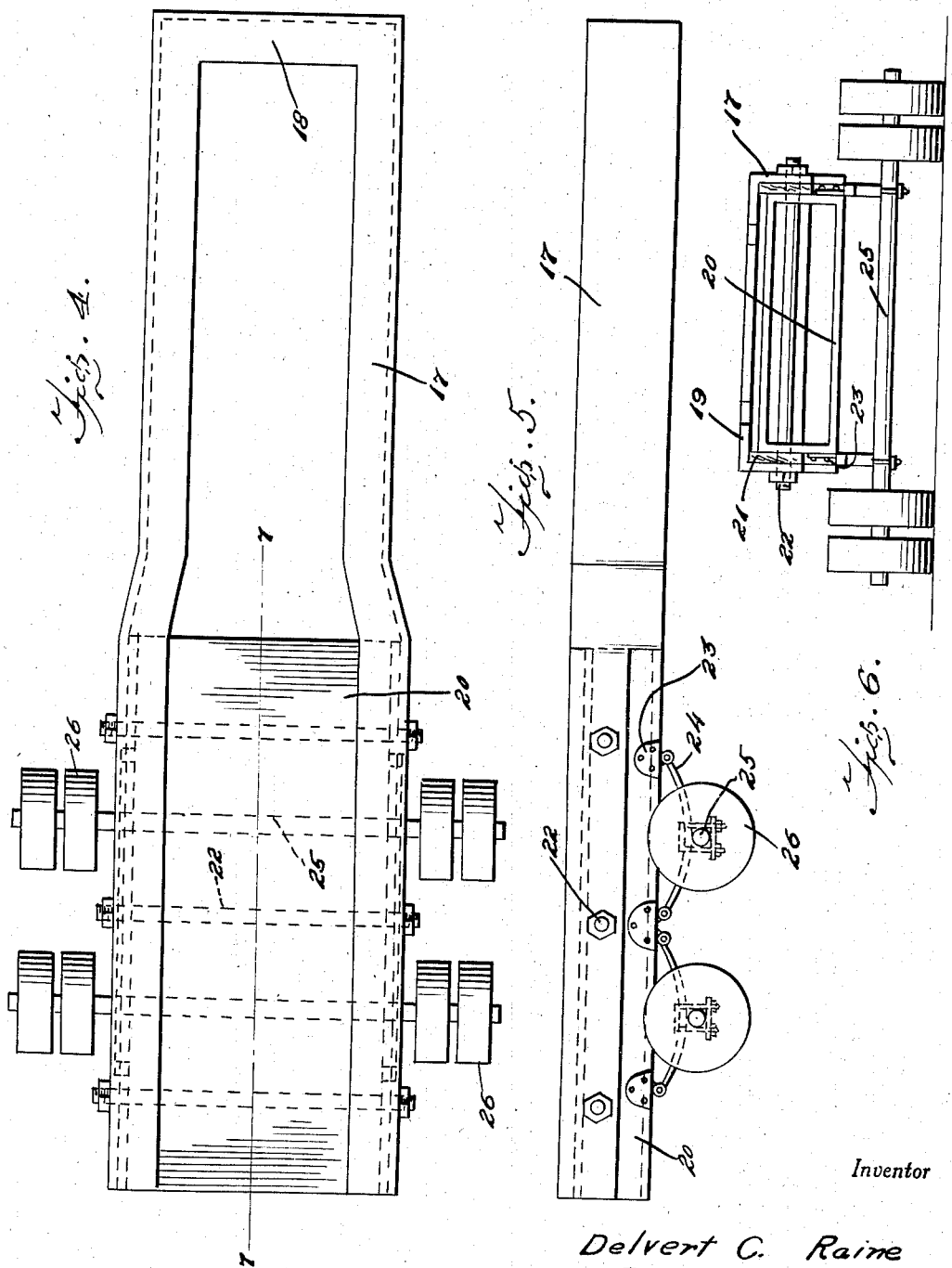
Inventor
Delvert C. Raine
By Clarence A. O'Brien
Attorney Dec. 30, 1941.                D. C. RAINE                2,268,167
                          VEHICLE CONSTRUCTION
                          Filed Sept. 5, 1940            3 Sheets—Sheet 3

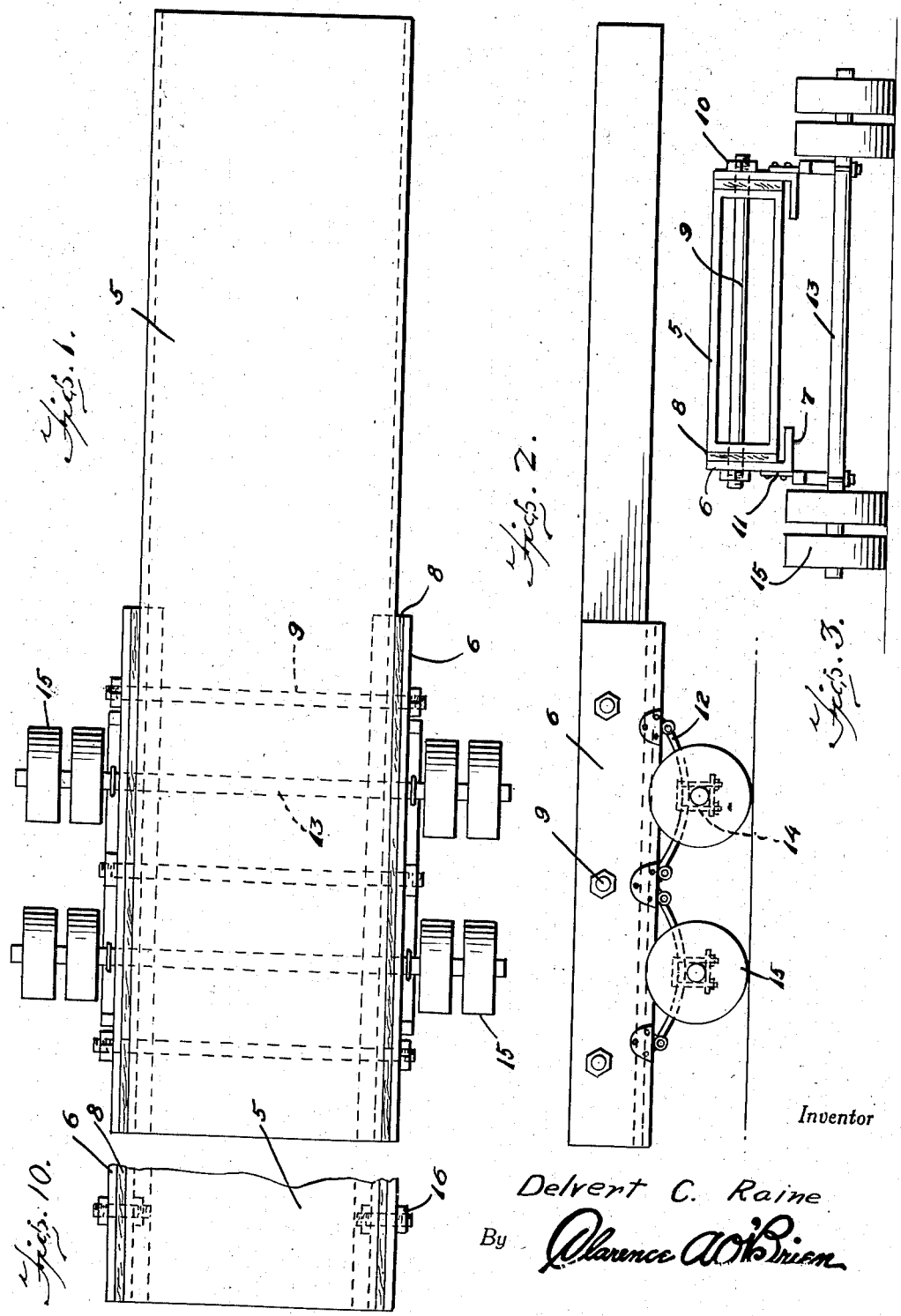

Inventor

Delvert C. Raine

By Clarence A. O'Brien

Attorney

Patented Dec. 30, 1941

2,268,167

UNITED STATES PATENT OFFICE 2,268,167

VEHICLE CONSTRUCTION

Delvert C. Raine, Burbank, Calif., assignor of one-third to Arthur L. Paulus, Los Angeles, Calif.

Application September 5, 1940, Serial No. 355,511

2 Claims. (Cl. 296—35)

The present invention relates to new and useful improvements in vehicles and has for its primary object to provide a removable wheel truck construction adapted to be easily and quickly attached to and removed from the floor or frame of the body of a truck, trailer, or similar vehicle.

A further object of the present invention is to provide a removable wheel tractor unit which is simple in construction, strong and durable, may be easily and quickly secured in position to the vehicle body and which at the same time is relatively inexpensive to manufacture and otherwise well adapted for the purposes for which the same is intended.

Other objects and advantages reside in the details of construction as more fully hereinafter described and claimed, reference being had to the accompanying drawings forming part hereof, wherein like numerals refer to like parts throughout, and in which—

Figure 1 is a top plan view,

Figure 2 is a side elevational view,

Figure 3 is a rear end elevational view,

Figure 4 is a top plan view of a modified form of structure,

Figure 5 is a side elevational view thereof,

Figure 6 is a rear elevational view,

Figure 10 is a fragmentary plan view illustrating a modified bolt construction for connecting the sides of the body and wheel truck.

Figure 7:
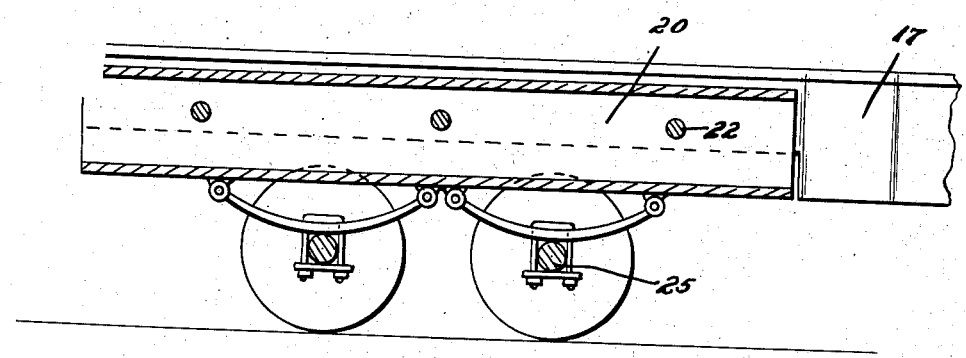
Figure 7 is a fragmentary longitudinal sectional view taken substantially on the line 7—7 of Figure 4.

Referring now to the drawings in detail, and with particular reference to Figures 1 to 3 inclusive, the numeral 5 designates the floor of a vehicle body of flat hollow metallic construction as shown to advantage in Figure 3 which is disposed inwardly of a pair of angle iron beams 6, the beams including the inturned lower flange 7 positioned beneath the bottom of the floor member 5. Interposed between the sides of the floor 5 and the beams 6 is a wooden spacing member 8.

The floor 5 is secured in position to the beams 6 by means of a plurality of transversely extending bolts 9 having their ends projecting outwardly at each side of the beams and secured in position by nuts 10.

To the outer side of the beams 6 are riveted or otherwise secured the spring hangers 11 from which the springs 12 depend, the springs being secured to the axles 13 by the U-bolts 14 and on the outer ends of the axle the wheels 15 are journalled.

The beams 6, springs 12, axles 13 and wheels 15 thus constitute a unitary structure which may be easily and quickly removed from the floor 5 of the body of the vehicle by removing the bolts 9. The truck for the wheels may thus be easily and quickly removed from the body and replaced, when desired, without necessitating any interference with the use of the remainder of the truck.

In Figure 10 of the drawings I have illustrated bolts 16 for connecting the sides of the floor 5 with the beams 6, said bolts extending only through each of the sides of the assembled structure.

In Figures 4 to 6 inclusive I have illustrated a frame-like bed or bottom 17 for the truck, the frame being connected at its front end by a cross frame member 18, the rear end of the bed being unconnected as shown in Figure 4 of the drawings. The side of the bed frame is of angle shape in cross section as shown in Figure 6 of the drawings, and includes the horizontal flange 19 which extends inwardly at the upper edge of the frame and overlies the hollow truck frame 20 which is disposed inwardly of the frame member 17. Wooden spacing blocks 21 are also positioned between the sides of the frames 17 and 20, said frame members also being secured together by bolts 22.

To the lower sides of the frame member 20 are also secured the spring hangers 23 for attaching the springs 24, axles 25 and wheels 26.

In this form of the invention the front end of the bed frame 17 may be of a reduced width, as shown in Figure 4 of the drawings.

Figure 8:
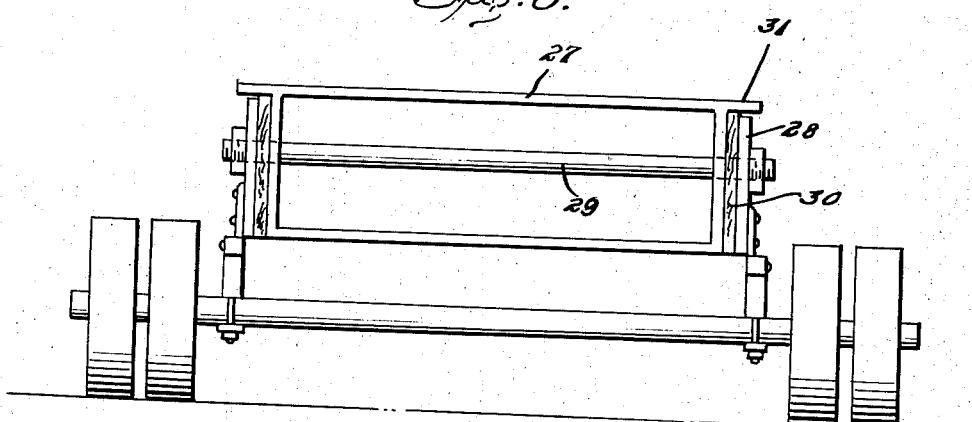
Figure 8 is a rear elevational view of a further modification.

In Figure 8 of the drawings the hollow bottom of the truck body is designated at 27 while the beams are shown at 28 connected thereto by the bolts 29 and between which the wooden spacing blocks 30 are inserted. The beams 28 are of flat construction and the upper edges of the bottom 27, at each side, are formed with outwardly projecting flanges 31 which overlie the upper edges of the beams 28.

Figure 9:
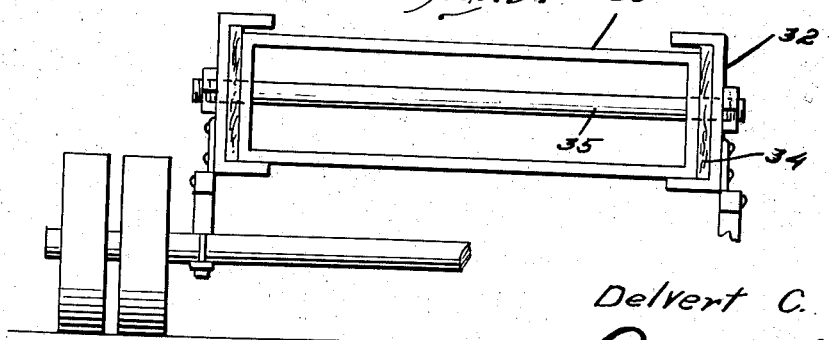
Figure 9 represents an additional modified construction.

In Figure 9 of the drawings the beams 32 are of channel form in cross section, the channel of the beams being arranged in opposed relation to accommodate the hollow bottom 33 of the truck body. Each of the channel members are provided with the wooden spacing blocks 34 and the parts are secured in position by the transversely extending bolts 35.

In each form of the invention it will be noted that the transversely extending bolts are not depended upon to support the load, as in each instance either the bottom of the body of the truck, or the beams of the wheel trucks are provided with flanges which will serve to support the load, should the bolts 29 break or otherwise fail.

From the foregoing it will be apparent that the beams of the wheel trucks may be detached from the bottom portion of the truck body so that the wheel trucks may be easily removed and replaced for repair purposes when desired.

It is believed the details of construction and advantages of the device will be readily understood from the foregoing without further detailed explanation.

Having thus described the invention, what I claim is:

1. In a vehicle, a hollow body of flat rectangular form transversely, and a wheel truck for supporting said body comprising a pair of flat side beams extending alongside the sides of the body parallel therewith and spaced laterally therefrom, a pair of flat wooden spacer beams extending between said sides of the body and said side beams, bolts extending through said side and spacer beams and said body, and edge flanges on said body overlying the upper edges of said side beams to act as auxiliary supports in the event of failure of said bolts.

2. In a vehicle, a hollow frame structure of flat rectangular form transversely, a second frame structure comprising a pair of beams extending alongside the sides of the frame structure first mentioned parallel therewith and laterally spaced therefrom, a pair of flat wooden beams extending between the sides of said structure first mentioned and said beams and spacing said beams from said sides, and bolts extending through said structure first mentioned, and said beams, one of the structures embodying a pair of lateral elongated flanges constructed and arranged to function as auxiliary supports for the other structure in the event of failure of said bolts and normally spaced from the other structure, and wheels mounted on said one structure.

DELVERT C. RAINE.